United States Patent
Lundgren et al.

(10) Patent No.: US 8,305,267 B2
(45) Date of Patent: Nov. 6, 2012

(54) METHOD AND SYSTEM FOR STABILIZING A GNSS CLOCK BY REDUCING INTERFERENCE

(75) Inventors: David Lundgren, Mill Valley, CA (US); Charles Abraham, Los Gatos, CA (US); Mark Buer, Gilbert, AZ (US); David Garrett, Tustin, CA (US); Jeyhan Karaoguz, Irvine, CA (US); Dave Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 359 days.

(21) Appl. No.: 12/732,665

(22) Filed: Mar. 26, 2010

(65) Prior Publication Data
US 2011/0199261 A1    Aug. 18, 2011

Related U.S. Application Data

(60) Provisional application No. 61/303,908, filed on Feb. 12, 2010.

(51) Int. Cl.
*G01S 19/23* (2010.01)
(52) U.S. Cl. .................................. 342/357.62
(58) Field of Classification Search ............. 342/357.62, 342/357.74
See application file for complete search history.

(56) References Cited

U.S. PATENT DOCUMENTS

| | | | |
|---|---|---|---|
| 2003/0225893 A1 | 12/2003 | Roese et al. | |
| 2006/0238416 A1* | 10/2006 | Voor et al. | 342/357.06 |
| 2009/0296361 A1* | 12/2009 | Huang et al. | 361/783 |

OTHER PUBLICATIONS

J. Ashjaee, GPS: The Challenge of a Single Chip, GPS World, p. 24-27, May 2001.*
crystal oscillator (XO). (2001). In Hargrave's Communications Dictionary, Wiley. Retrieved from http://www.credoreference.com/entry/hargravecomms/crystal_oscillator_xo.*

* cited by examiner

*Primary Examiner* — Jack W Keith
*Assistant Examiner* — Fred H Mull
(74) *Attorney, Agent, or Firm* — Sterne, Kessler, Goldstein & Fox P.L.L.C.

(57) ABSTRACT

Methods and systems for stabilizing a GNSS clock by reducing interference are disclosed and may include stabilizing a frequency of a temperature compensated crystal oscillator (TCXO) on a chip in a GNSS device. A clock signal may be generated for the device by temporarily configuring circuitry adjacent to the TCXO at a constant power level. Temperature and electromagnetic interference of the TCXO may be stabilized by the constant power level of the adjacent circuitry, which may be on the chip or external to the chip. The frequency of the TCXO may be stabilized by temporarily disabling the adjacent circuitry. A GNSS clock signal may be stabilized by the configuring of the constant power level while a GNSS location may be calibrated. A GNSS location of a fixed wireless device, such as a wireless access point, may be calibrated utilizing the configured constant power level and shared with other wireless devices.

22 Claims, 4 Drawing Sheets

METHOD AND SYSTEM FOR STABILIZING A GNSS CLOCK BY REDUCING INTERFERENCE

CROSS-REFERENCE TO RELATED APPLICATIONS/INCORPORATION BY REFERENCE

This application claims the benefit of U.S. Provisional Application Ser. No. 61/303,908, filed on Feb. 12, 2010.

This application also makes reference to:

U.S. patent application Ser. No. 12/748,225, filed on Mar. 26, 2010;

U.S. patent application Ser. No. 12/748,050, filed on Mar. 26, 2010;

U.S. Provisional Application Ser. No. 61/306,393, filed on Feb. 19, 2010; and

U.S. Provisional Application Ser. No. 61/306,727, filed on Feb. 22, 2010.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for stabilizing a GNSS clock by reducing interference.

BACKGROUND OF THE INVENTION

Global navigation satellite systems (GNSS) receivers may normally determine their position by receiving satellite broadcast signals from a plurality of satellites. These satellites, for example 24 at any time for the Global Positioning System (GPS), may broadcast radio frequency signals that comprise information that may be exploited by the satellite receiver to determine its own position. By measuring the time the broadcast signals may travel from the satellites to the satellite receiver, and the known position of the transmitting satellite, the satellite receiver may be able to determine its own position by trilateration. In general, at least 3 satellite signals may need to be decoded at the satellite receiver in order to determine its position.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for stabilizing a GNSS clock by reducing interference, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for stabilizing a GNSS clock by reducing interference. Exemplary aspects of the invention may comprise stabilizing an oscillation frequency of a temperature compensated crystal oscillator (TCXO) on a chip or integrated circuit in a global navigation satellite system (GNSS) device. The TCXO may be operable to generate a stabilized clock signal for the GNSS device by temporarily configuring at least a portion of the circuitry adjacent to the TCXO at a constant power level. A temperature of the TCXO may be stabilized by the constant power level of the adjacent circuitry. Electromagnetic interference may be reduced in the TCXO by configuring the constant power level of the adjacent circuitry, which may be on or external to the chip or integrated circuit. The oscillation frequency of the TCXO may be stabilized by temporarily disabling the circuitry adjacent to the TCXO. A GNSS clock signal may be stabilized by the configuring of the adjacent circuits at the constant power level. A GNSS location may be calibrated while the GNNS clock signal is stabilized by the configuring of the adjacent circuits at the constant power level. A GNSS location of a fixed wireless device may be calibrated utilizing the configuring of the adjacent circuits at the constant power level for sharing the calibrated location with other wireless devices that communicate with the fixed wireless device. The fixed wireless device may comprise a wireless access point.

Figure 1A:
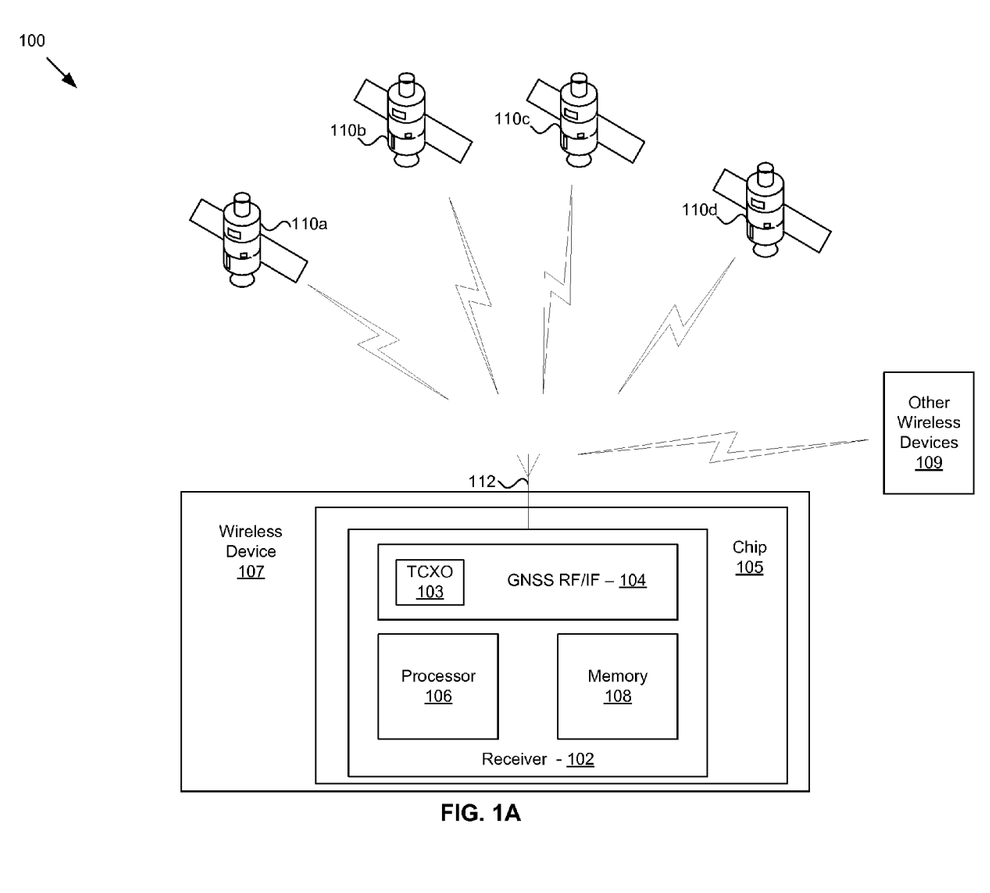
FIG. 1A is a diagram illustrating an exemplary satellite navigation system, in accordance with an embodiment of the invention.

FIG. 1A is a diagram illustrating an exemplary satellite navigation system, in accordance with an embodiment of the invention. Referring to FIG. 1A, there is shown a satellite navigation system 100, comprising a satellite receiver 102 in a wireless device 107, other wireless devices 109, and a plurality of satellites, of which satellites 110a, 110b, 110c, 110d may be illustrated. The satellite receiver 102 may be communicatively coupled to a receiver antenna 112. The satellite receiver 102 may comprise a Global Navigation Satellite System (GNSS) radio-frequency (RF) and intermediate-frequency (IF) front-end 104, a processor 106, and memory 108.

The satellites 110a through 110d may comprise suitable logic, circuitry, interfaces, and/or code that may be operable to generate and broadcast suitable radio-frequency signals that may be received by a satellite receiver, for example satellite receiver 102, to determine the satellite receiver 102 position.

The wireless device 107 and the other wireless devices 109 may comprise any wireless device that may utilize GNSS technology, such as smart phones, PDAs, wireless access points, or cell phones, for example. The chip or integrated circuit 105 may comprise the GNSS RF/IF front-end 104, the processor 106, and the memory 108, but is not so limited. Accordingly, any number of circuits may be integrated on the chip or integrated circuit 105 depending on size and power requirements, for example. In addition, the GNSS RF/IF front-end 104, the processor 106, and the memory 108 may be integrated on separate chips in the wireless device 107.

The satellite receiver 102 may comprise suitable logic, circuitry, interfaces, and/or code that may be operable to receive signals broadcasted from satellites, for example satellites 110a through 110d, and process the received signals to determine the position of the wireless device 107.

The GNSS RF/IF front-end 104 may comprise suitable logic, circuitry, interfaces, and/or code that may be operable to receive satellite broadcast signals via receiver antenna 112 and process them in a desirable fashion to generate baseband signals, which may be suitable for further processing in the satellite receiver 102 and the processor 106. For example, the GNSS RF/IF front-end 104 may comprise a temperature-compensated crystal oscillator (TCXO) 103 that may comprise suitable circuitry, logic, interfaces, and/or code that may be operable to generate one or more clock signals which may be utilized to process received GNSS signals. In this regard, the clock signals generated by the TCXO 103 GNSS RF/IF front-end 104 may be communicatively coupled to the processor 106 and/or the memory 108 and may be utilized for generating and/or tracking time in the receiver 102. The memory 108 may comprise suitable logic, circuitry, interfaces, and/or code that may enable storage and access to data and code suitable for the operations performed by the satellite receiver 102 and the processor 106.

In FIG. 1A, an exemplary satellite navigation scenario may be illustrated, wherein a satellite receiver 102 may receive a plurality of satellite signals from which the satellite receiver 102 may be able to extract information that may enable the satellite receiver to determine its position. The satellite receiver 102 and the satellites, for example satellites 110a through 110d, may be operating in compliance with the Global Positioning System (GPS) developed and operated by the United States of America Department of Defense. In accordance with various embodiments of the invention, the invention may not be limited to application in GPS and may be applied to other GNSS systems, for example GALILEO, GLONASS, IRNSS, and BEIDOU.

In operation, power consumption of the receiver 102 may be reduced by periodically powering down portions of the receiver 102. However, to quickly and accurately determine position, a time, $t_r$, may be maintained in the receiver 102 and $t_r$ may be synchronized with, or otherwise have a fixed relationship to, a time $t_s$ maintained in the satellites 110. Thus, aspects of the invention may enable maintaining accuracy of the time $t_r$ with respect to satellite time $t_s$ when portions of the receiver 102 may be periodically powered down.

The clock signals in the GNSS RF/IF front-end 104 may be generated by the TCXO 103 and may be operable to compensate for slow to moderately-varying temperatures. This compensation may be accomplished by utilizing a circuit that senses the temperature in the TCXO and applies a small correction voltage to the oscillator, for example. However, the intermittent use of nearby circuitry, either on the same chip or integrated circuit or on adjacent chips or integrated circuits in the receiver 102, may exposed the TCXO 103 to small temperature variations over a very short period of time, called thermal microshocks. For example, when a phone call is received by a wireless device comprising the receiver 102, RF and audio amplifier circuitry may be activated, causing a brief localized spike in temperature. These microshocks may cause brief shifts in the oscillating frequency of the TCXO 103.

In an exemplary embodiment of the invention, thermal microshocks in the TCXO 103 may be mitigated by actively controlling the nearby circuitry. For example, when a high accuracy clock may be needed, such as when a highly accurate GNSS location calibration may be desired, nearby circuitry may be operated at a known power level to stabilize the temperature of the TCXO 103. In an exemplary embodiment of the invention, nearby circuitry may be operated at maximum power to force the temperature of the TCXO 103 to a higher, but stable, temperature. In this manner, the TCXO 103 may compensate for the temperature change, but not be exposed to short duration thermal shocks.

Figure 1B:
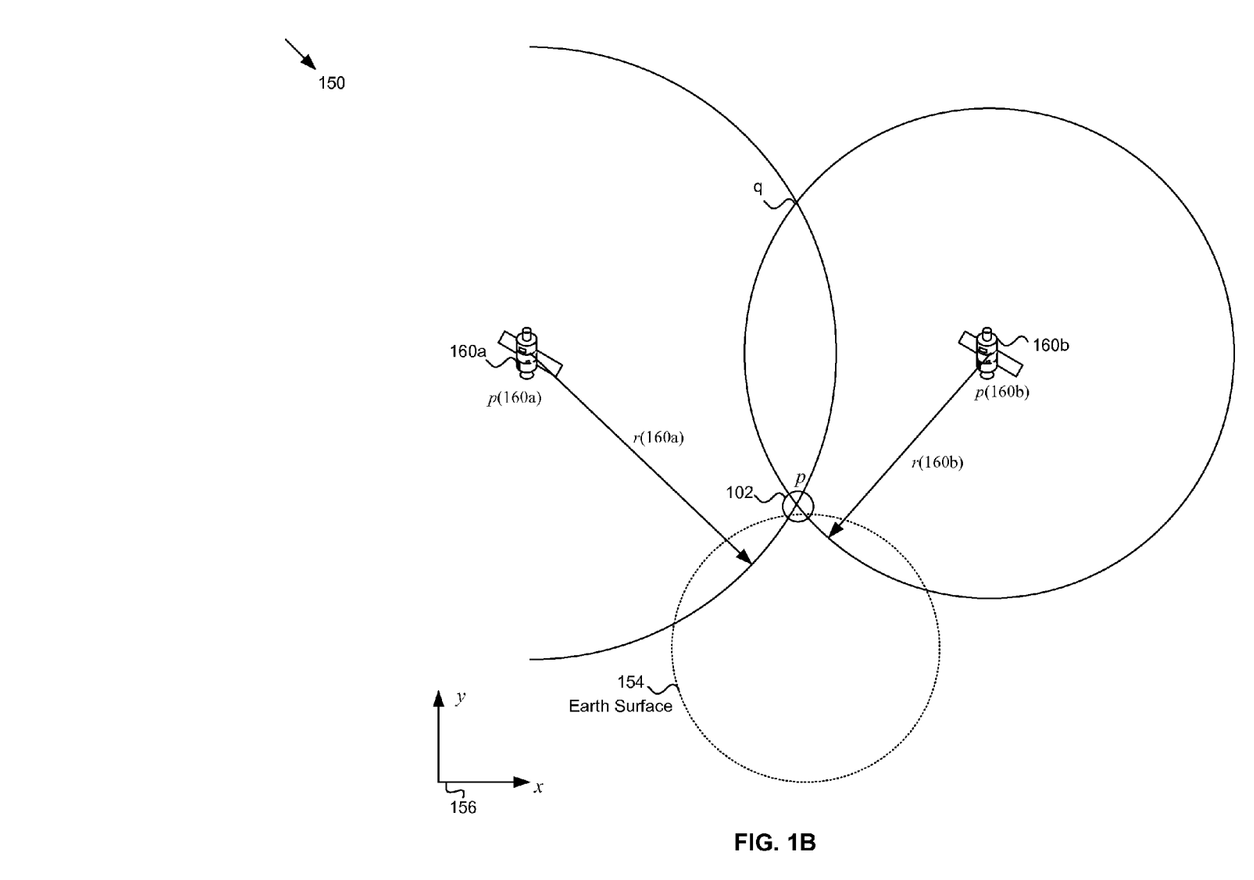
FIG. 1B is a diagram illustrating an exemplary satellite navigation system in a two-dimensional setting, in accordance with an embodiment of the invention.

FIG. 1B is a diagram illustrating an exemplary satellite navigation system in a two-dimensional setting, in accordance with an embodiment of the invention. Referring to FIG. 1B, there is shown a satellite navigation system 150, comprising the receiver 102 (illustrated by a small circle) at position p, satellites 160a and 160b, an earth surface 154 illustrated by a dotted circle, and an exemplary two-dimensional coordinate system 156. There is also shown a position of satellite 160a denoted p(160a), a position of satellite 160b denoted p(160b), an intersection point q, a range from satellite 160a to the satellite receiver 102 r(160a) and a range from satellite 160b to the satellite receiver 102 r(160b).

To illustrate the principles involved in determining a position of the receiver 102 from the satellites, for example the satellites 160a and 160b, it may be useful to consider a two-dimensional scenario as illustrated in FIG. 1B. The three-dimensional case encountered in reality may be considered an extension to three dimensions of the principles demonstrated in the two-dimensional case. As illustrated in FIG. 1B, the principle of determining the position p of the satellite receiver 102 may be to measure the range from the satellite receiver 102 to a plurality of satellites, for example r(160a) and r(160b), based on the known positions of the satellites, for example p(160a), and p(160b). Based on the measured ranges from the satellites 160a and 160b to the satellite receiver 102 and the known position of the satellites, each satellite may define a circle of positions that lie at a given range from the satellite, as illustrated in FIG. 1B. In the case of two satellites, there may be two intersection points: one may be the desired position p and the other may be the intersection q. As may be observed from FIG. 1B, only p may be close to the surface of the earth. Hence, only p may be a feasible solution for the position of the satellite receiver 102. Therefore, in the depicted two-dimensional scenario of FIG. 1B, two satellites may suffice in principle to determine the position p. The position p may be given by one solution to the following relationships in the two-dimensional case:

$$r(k) = \|p(k) - p\|, k = 160a, 160b \qquad \text{EQ. 1}$$

In three dimensions, the circles around the satellites may become spheres and the intersection of two spheres may generate a circle of feasible solutions. By intersecting the circle with a further sphere, two possible positions will be found. Again, only one of the two solutions will be close to the surface of the earth. Therefore, in the three dimensional case, the solution may require 1 more satellite to resolve the extra dimension and the position may be resolved from the following relationship, where each k may denote a different satellite:

$$r(k) = \|p(k) - p\|, k = 1, 2, 3 \qquad \text{EQ. 2}$$

Each satellite, for example satellites 160a and 160b, may broadcast a signal that may comprise information to determine the satellite's position. Once placed in orbit, a satellite's position may be predictable. This predicted position of the satellites may generally be available in an almanac at the satellite receiver and may be stored, for example, in the memory 108. Due to certain imperfections in computing the satellite's position, a GPS ground station may monitor the satellite's exact position. In order to correct for any deviations from the almanac position, the ground station may supply the satellite with data that may allow the satellite's position to be determined to a high degree of accuracy when received by a satellite receiver. This data may be valid for a limited time only and may be referred to as ephemeris data. Its ephemeris data may be broadcast by each satellite, and may be received by the satellite receiver. The satellite position p(k,t) of satellite k, may be computed using the ephemeris data. The almanac position P(k,t) of a given satellite k may hence be related to the position p(k,t) together with a correction term $\Delta(k,t)$ from the following relationship:

$$p(k,t)=P(k,t)+\Delta(k,t) \quad \text{EQ. 3}$$

where the variable t may denote time and indicate that the position of the satellite may change as a function of time. In instances where the correction term $\Delta(k,t)$ may be available at a satellite receiver, for example satellite receiver 102, the exact position of the satellite k may be determined to a high degree of accuracy.

The range r(k) may be determined from measuring the time it may take for the transmission to travel from the satellite, for example satellite 160a, to the satellite receiver 102. Ideally, the clocks of the satellite 160a and the satellite receiver 102 may be synchronized and the travel time $\tau(k)$ may be determined. In this regard, a signal may be transmitted at absolute time $t_1$ which may correspond to satellite time $t_{s1}$ and may be received at the receiver 102 at absolute time $t_4$, which may correspond to receiver time $t_{r4}$. In this manner, in instances that receiver time, $t_r$, may be accurately maintained, the calculated travel time, $\tau_C$, may be equal to the actual travel time, $\tau_A$:

$$\tau_C = t_{r4} - t_{s1} = t_4 - t_1 = \tau_A. \quad \text{EQ. 4}$$

However, in instances that receiver time, $t_r$, may not be accurately maintained, such as when the clock source, such as the TCXO 103 in the receiver 102, may be subject to thermal microshocks, the calculated time, $\tau_C$, may be different from the actual travel time, $\tau_A$, resulting in errors in determining position. For example, the TCXO 103 may experience a thermal microshock at absolute time $t_2$ ending at absolute time $t_3$ and may inaccurately track time during the time interval $t_2$ to $t_3$, where $t_1 < t_2 < t_3 < t_4$. Thus, since receiver time has advanced by one amount:

$$t_{r4} - t_{r1} = (t_4 - t_1) - (t_3 - t_2), \quad \text{EQ. 5}$$

while satellite time has advanced by a different amount:

$$t_{s4} - t_{s1} = t_4 - t_1, \quad \text{EQ. 6}$$

the calculated time, $\tau_C$, may be incorrectly calculated as:

$$\tau_C = t_{r4} - t_{s1} = (t_2 + (t_4 - t_3)) - t_1 = (t_4 - t_1) - (t_3 - t_2) \neq \tau_A. \quad \text{EQ. 7}$$

Accordingly, aspects of the invention may enable maintaining accurate time in the receiver 102 such that the travel time may be accurately calculated by the receiver 102 when the TCXO 103 is isolated from thermal microshocks by actively controlling nearby circuitry.

Figure 2:
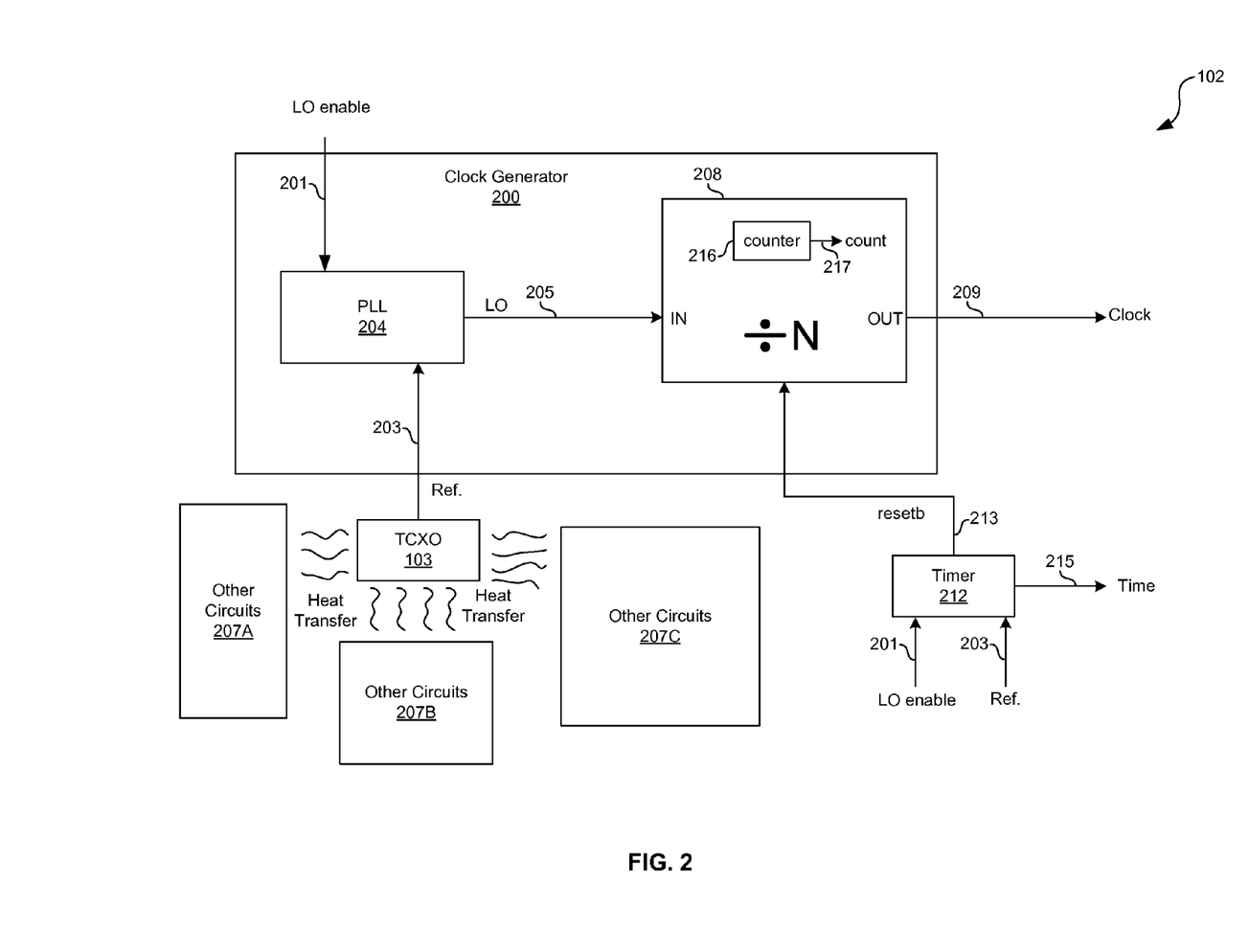
FIG. 2 is a diagram of a portion of a GNSS receiver utilizing TCXO stabilization, in accordance with an embodiment of the invention.

FIG. 2 is a diagram of a portion of a GNSS receiver utilizing TCXO stabilization, in accordance with an embodiment of the invention. Referring to FIG. 2 there is shown a clock generator 200, the TCXO 103, and a timer 212. There is also shown other circuits 207A-207C that may comprise any other circuitry in the receiver 102.

The clock generator 200 may comprise suitable logic, circuitry, interfaces, and/or code that may be operable to generate a digital clock signal 209 based on a reference signal 203. In various embodiments of the invention, the clock generator 200 may be implemented in the GNSS RF/IF front-end 104. In an exemplary embodiment of the invention, the clock generator 200 may comprise a PLL 204 and a frequency divider 208. Processing of GNSS signals and calculation of position of the receiver 102 may be based on the clock signal 209. In this regard, during normal operation, the clock signal 209 may enable maintaining accurate receiver time.

The PLL 204 may comprise suitable logic, circuitry, interfaces, and/or code that may enable generating a local oscillator (LO) signal 205 based on a reference signal 203. In an exemplary embodiment of the invention, the TCXO 103 may provide the reference signal 203 to the PLL 204. Additionally, operation of the PLL 204 may depend on an LO enable signal 201. The LO enable signal 201 may be a power supply to the clock generator 200 or may be a digital signal corresponding to a state of the power supply to the clock generator 200. For example, when the LO enable signal 201 is low, the clock generator 200 may be in a low(er) power state and generation of the LO signal 205 and the clock signal 209 may be disabled. Alternatively, when the LO enable signal 201 is high, the clock generator 200 may be powered up and the PLL 204 may generate the LO signal 205 and the divider 208 may generate the clock signal 209.

The frequency divider 208 may comprise suitable logic, circuitry, interfaces, and/or code that may enable outputting the clock signal 209 which may differ from the input LO signal 205 by the factor '1/N', where 'N' may be an integer or a fraction greater than 0. In various embodiments of the invention, the divider 208 may comprise one or more counters 216. In this regard, each time a programmed value may be reached, the clock 209 may be toggled and the counter 216 may be reset to 0. For example, the divider 208 may comprise a 4-bit counter and may toggle on alternating counts of 'L' reference signal cycles and 'M' reference signal cycles. In this regard, 'N' may be determined by 'L+M' and the duty cycle of the clock signal 209 may be 'M/N'. The frequency divider may buffer and/or latch the reset b signal 213. In this manner, reset and/or initialization of the counter 216 and/or other portions of the divider 208 may be synchronized to the LO signal 205.

The timer 212 may comprise suitable logic, circuitry, interfaces, and/or code that may enable tracking time. In an exemplary embodiment of the invention, the timer 212 may be an up-counter and may be implemented in the processor 106 and/or the memory 108. The timer 212 may also comprise suitable logic, circuitry, interfaces, and/or code that may enable generating a reset signal, resetb 213, which may be synchronized with an active edge of the reference signal 203.

In operation, the clock generator 200 may be periodically powered down to reduce power consumption in the GNSS receiver 102. However, the clock 209 may be utilized for tracking time in the GNSS receiver 102. Various aspects of the invention may enable keeping track of time by clocking the timer 112 with the reference signal 203 while the clock signal 209 may be absent. Accordingly, subsequent to a time interval during which the clock 209 may have been absent, the value of the timer 112 may be utilized to correct the receiver time $t_r$. In this regard, the timer 112 may enable maintaining synchronization and/or a fixed timing relationship between the receiver 102 and a satellite such as the satellites 160 of FIG. 1B.

For example, at receiver time $t_{ra}$, corresponding to absolute time $t_2$, the LO enable signal 201 may be de-asserted and a value stored in the timer 212 may increment (or decrement in the case of a down-counter) on each active edge of the reference signal 203. Subsequently, at receiver time $t_{rb}$, corresponding to absolute time $t_3$, the LO enable signal 201 may be re-asserted. In this regard, if time was not tracked during the interval $t_2$ to $t_3$, then upon powering up the clock generator 200, the receiver time $t_{rb}$ may still be equal to $t_{ra}=t_2$. Accordingly, a value of the timer 212 just prior to re-assertion of the LO enable signal 203 may be utilized to correct the receiver time, such that $t_{rb}=t_3$ (within a tolerance).

In this regard, when the clock 209 returns, the processor 108 may fetch the value from the timer 212 and may correct the receiver time to restore synchronization and/or a fixed relationship to (within a tolerance) satellite time. However, the length of time between the last increment of the timer 212 and the first active edge of the clock 209 may vary and thus lead to error in the correction of the receiver time. In this regard, the length of time between the last increment of the timer 212 and the first active edge of the clock 209 may vary because the value of the counter 216 may be random and unknown at the time LO enable was de-asserted. For example, for a first re-assertion of the LO enable signal 201, the counter 216 may be equal to zero and for a second re-assertion of the LO enable signal 201 the counter 216 may be equal to 'L'. Consequently, the clock 209 may toggle after 'L' LO 205 cycles in the first case and one LO 205 cycle in the second case. Thus, the variance between the last increment of the timer 212 and the first active edge of the clock 209 may be from one to 'L' (or 'M') cycles of the LO signal 205. Accordingly, the counter 216 may be reset at or near a time when the LO enable signal 201 may be de-asserted such that the length of time between the last increment of the timer 212 and the first active edge of the clock 209 may be determined within one period of the LO signal 205.

In an exemplary embodiment of the invention, the TCXO 103 may provide the reference signal 203 for generating the clock signal 209. The TCXO 103 may be operable to provide a stable clock signal even with temperature variations. However, temperature shifts in short timeframes, or thermal microshocks, may be outside of the capability of the TCXO 103 to compensate. Thermal microshocks may occur when circuitry in the other circuits 207A-207C or the clock generator 200 switch between high or low power states. Accordingly, to reduce and/or eliminate these microshocks, the other circuits 207A-207C may be configured in a known, and constant, power state for a period of time desired for a stable and accurate reference signal 203.

For example, when a highly stable reference signal 203 is desired at a particular time, such as for an accurate GNSS location calibration, the other circuits 207A-207C may be configured at a high, or maximum, power state prior to that particular time. This may result in an increase in the temperature of the TCXO 103 that may be compensated for by the temperature compensation ability of the TCXO 103, and may also reduce and/or eliminate any sudden temperature changes that may be outside the capability of the TCXO 103.

The configured stability of the TCXO 103 is not limited to thermal variations. Electromagnetic signal variation and noise, or electromagnetic interference (EMI), may also cause instability of the TCXO 103, and as such, may be reduced by configuring nearby circuitry into a known and stable state. In this manner, thermal microshocks and EMI may be reduced and/or eliminated thereby improving the stability of the TCXO 103.

In an exemplary embodiment of the invention, the receiver 102 may be integrated in a wireless access point and/or femtocell, such as the other wireless devices 109 described with respect to FIG. 1A, that may be periodically accurately calibrated with a stabilized GNSS clock signal 209. Accordingly, the other circuits 207A-207C may be configured to a constant power level, thereby stabilizing the reference signal 203 and the clock signal 209. In an exemplary embodiment of the invention, nearby circuitry may be operated at maximum power to force the temperature of the TCXO 103 to a higher, but stable, temperature. In this manner, the TCXO 103 may compensate for the temperature change, but not be exposed to short duration thermal shocks. After the calibration, other wireless devices that may communicate with the access point, such as the other wireless devices 109, may receive the accurately calibrated GNSS position from the access point.

Figure 3:
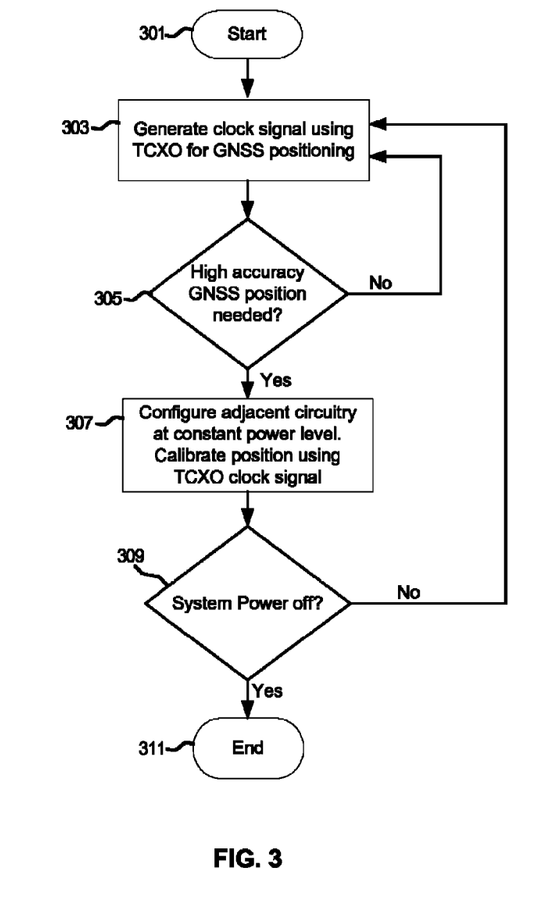
FIG. 3 is a block diagram illustrating exemplary steps for stabilizing a GNSS clock by reducing interference, in accordance with an embodiment of the invention.

FIG. 3 is a block diagram illustrating exemplary steps for stabilizing a GNSS clock by reducing interference, in accordance with an embodiment of the invention. Referring to FIG. 3, in step 303 after start step 301, a GNSS clock signal may be generated by a TOXO for GNSS positioning. In step 305, in instances where a higher accuracy positioning calibration may be desired, the exemplary steps may proceed to step 307 where circuitry adjacent to the TOXO may be configured at a constant power level. A higher accuracy positioning calibration may then be enabled due to the reduced temperature and EMI fluctuations the TOXO may be exposed to. In step 307, in instances where a higher accuracy positioning calibration is not needed, the exemplary steps may proceed back to step 303. In step 309, in instances where the wireless device 107 is to be powered down, the exemplary steps may proceed to end step 311. In step 309, in instances where the wireless device 107 is not to be powered down, the exemplary steps may proceed to step 303 to generate the GNSS clock signal by the TCXO for GNSS positioning.

In an embodiment of the invention, a method and system are disclosed for stabilizing an oscillation frequency 203 of a temperature compensated crystal oscillator (TCXO) 103 on a chip or integrated circuit 105 in a global navigation satellite system (GNSS) device 102. The TCXO 103 may be operable to generate a stabilized clock signal for the GNSS device 102 by temporarily configuring at least a portion of the circuitry 207A-207C adjacent to the TCXO 103 at a constant power level. A temperature of the TCXO 103 may be stabilized by the constant power level of the adjacent circuitry 207A-207C. Electromagnetic interference may be reduced in the TCXO 103 by configuring the constant power level of the adjacent circuitry 207A-207C, which may be on the chip or integrated circuit 105 or external to the chip or integrated circuit 105. The oscillation frequency of the TCXO 103 may be stabilized by temporarily disabling the circuitry 207A-207C adjacent to the TCXO 103. A GNSS clock signal 209 may be stabilized by the configuring of the adjacent circuits at the constant power level. A GNSS location may be calibrated while the GNNS clock signal 209 is stabilized by the configuring of the adjacent circuits 207A-207C at the constant power level. A GNSS location of a fixed wireless device 107 may be calibrated utilizing the configuring of the adjacent circuits 207A-207C at the constant power level for sharing the calibrated location with other wireless devices 109 that communicate with the fixed wireless device 107. The fixed wireless device 107 may comprise a wireless access point.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for stabilizing a GNSS clock by reducing interference.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip or integrated circuit, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication in a global navigation satellite system (GNSS) device having a temperature compensated crystal oscillator (TCXO) on an integrated circuit, comprising:
    stabilizing an oscillation frequency of said TCXO, which is operable to generate a clock signal for said GNSS device, wherein said stabilizing comprises:
    temporarily configuring at least a portion of one or more processors or circuits that are adjacent to said TCXO to operate at a constant power level.

2. The method according to claim 1, wherein said step of stabilizing said oscillation frequency comprises:
    stabilizing a temperature of said TCXO by said configuring said at least said portion of said one or more processors or circuits to operate at said constant power level.

3. The method according to claim 1, further comprising:
    configuring said at least said portion of said one or more processors or circuits to operate at said constant power level to reduce electromagnetic interference in said TCXO.

4. The method according to claim 1, wherein said step of temporarily configuring said at least said portion of said one or more processors or circuits comprises:
    temporarily configuring said at least said portion of said one or more processors or circuits to operate at said constant power level, said at least said portion of said one or more processors or circuits being on said integrated circuit.

5. The method according to claim 1, wherein said step of temporarily configuring said at least said portion of said one or more processors or circuits comprises:
    temporarily configuring said at least said portion of said one or more processors or circuits to operate at said constant power level, said at least said portion of said one or more processors or circuits being external to said integrated circuit.

6. The method according to claim 1, wherein said step of stabilizing said oscillation frequency comprises:
    temporarily disabling said at least said portion of said one or more processors or circuits to stabilize said oscillation frequency.

7. The method according to claim 1, further comprising:
    configuring said at least said portion of said one or more processors or circuits to operate at said constant power level to stabilize said clock signal.

8. The method according to claim 7, further comprising:
    configuring said at least said portion of said one or more processors or circuits to calibrate a GNSS location while said clock signal is stabilized.

9. The method according to claim 1, further comprising:
    calibrating a GNSS location of a fixed wireless device while said at least said portion of said one or more processors or circuits are configured to operate at said constant power level; and
    sharing said GNSS location with other wireless devices that communicate with said fixed wireless device.

10. The method according to claim 9, wherein said step of calibrating said GNSS location comprises:
    calibrating said GNSS location of a wireless access point.

11. The method according to claim 1, wherein said step of temporarily configuring comprises:
    temporarily configuring said at least said portion of said one or more processors or circuits to operate at a maximum power level.

12. An integrated circuit for use in a global navigation satellite system (GNSS) device, comprising:
    a temperature compensated crystal oscillator (TCXO) configured to generate a clock signal for said GNSS device; and
    one or more processors or circuits that are adjacent to said TCXO, at least a portion of said one or more processors or circuits being temporarily configurable to operate at a constant power level to stabilize an oscillation frequency of said TCXO.

13. The integrated circuit according to claim 12, wherein said at least said portion of said one or more processors or circuits are temporarily configurable to operate at said constant power to stabilize a temperature of said TCXO.

14. The integrated circuit according to claim 12, wherein said at least said portion of said one or more processors or circuits are temporarily configurable to reduce electromagnetic interference in said TCXO by operating at said constant power.

15. The integrated circuit according to claim 12, wherein said at least said portion of said one or more processors or circuits are on said integrated circuit.

16. The integrated circuit according to claim 12, wherein said at least said portion of said one or more processors or circuits are external to said integrated circuit.

17. The integrated circuit according to claim 12, wherein said at least said portion of said one or more processors or circuits are further configured to be temporarily disabled to stabilize said oscillation frequency.

18. The integrated circuit according to claim 12, wherein said at least said portion of said one or more processors or circuits are further configured to operate at said constant power to stabilize said clock signal.

19. The integrated circuit according to claim 18, wherein said at least said portion of said one or more processors or circuits are configured to calibrate a GNSS location while operating at said constant power level.

20. The integrated circuit according to claim 12, wherein said at least said portion of said one or more processors or circuits are configured:
    to calibrate a GNSS location of a fixed wireless device while operating at said constant power level and
    to share said GNSS location with other wireless devices that communicate with said fixed wireless device.

21. The integrated circuit according to claim 20, wherein said fixed wireless device comprises:
    a wireless access point.

22. The integrated circuit according to claim 12, wherein said constant power level comprises:
    a maximum power level.

* * * * *